United States Patent [19]
Krauer

[11] 3,783,358
[45] Jan. 1, 1974

[54] CONTROL SYSTEM FOR A RELUCTANCE TYPE MOTOR

[75] Inventor: Otto Albert Krauer, Tuckahoe, N.Y.

[73] Assignee: Otis Elevator Company, New York, N.Y.

[22] Filed: June 22, 1972

[21] Appl. No.: 265,174

[52] U.S. Cl. .............................. 318/166, 318/175
[51] Int. Cl. .............................................. H02p 7/36
[58] Field of Search ................... 318/166, 175, 227, 318/230, 231

[56] References Cited
UNITED STATES PATENTS

| | | | |
|---|---|---|---|
| 2,700,127 | 1/1955 | Sawyer | 318/175 |
| 3,372,323 | 3/1968 | Guyeska | 318/231 X |
| 3,383,574 | 5/1968 | Manteuffel | 318/175 X |
| 3,612,970 | 10/1971 | Sofan | 318/175 |

Primary Examiner—Gene Z. Rubinson
Attorney—Joseph L. Sharon et al.

[57] ABSTRACT

A control system for a reluctance type motor which is operable in response to a desired torque signal and a signal signifying the instantaneous speed of the motor as well as to a flux producing bias signal and to the position of the motor rotor to produce voltages for the phase windings of the motor which produce torque in response to a continuously applied load to maintain the rotor of the motor under such load at zero angular velocity at any angular position and to move it at any speed from zero angular velocity to a rated operating speed.

14 Claims, 1 Drawing Figure

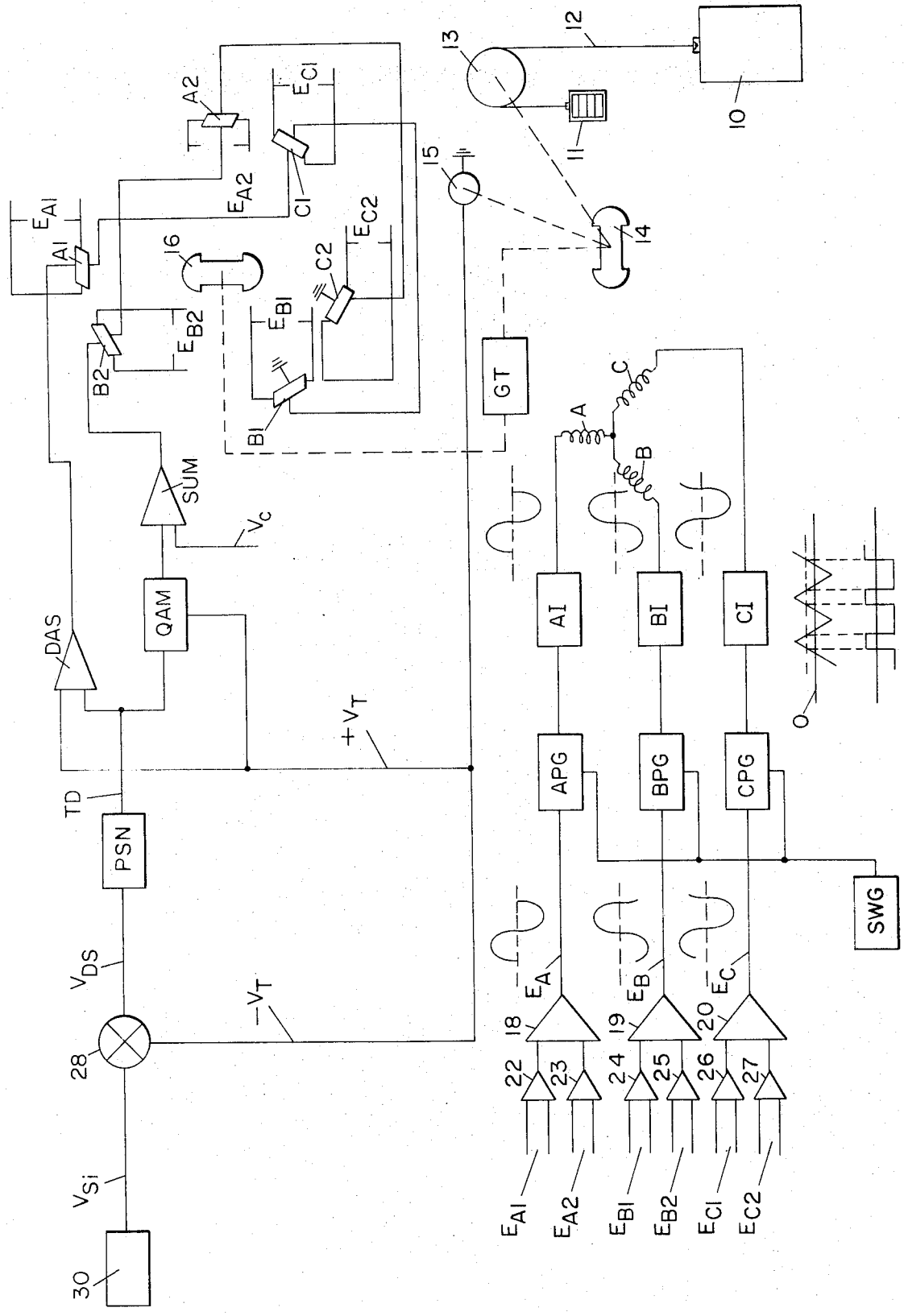

1

CONTROL SYSTEM FOR A RELUCTANCE TYPE MOTOR

This invention relates to controls for reluctance type motors.

This application is related to my co-pending application Ser. No. 141,683, filed May 10, 1971, now U.S. Pat. No. 3,737,747 in that it expands on the disclosure of that application to render its subject matter suitable for use with a reluctance type motor. It is desirable to utilize a reluctance type motor in place of other more commonly used alternating current motors, such as permanent magnet or wound rotor type synchronous motors, because the reluctance type motor is of such a simple design. Consequently, manufacturing costs are reduced considerably over those incurred with the more commonly used motors.

It is an object of this invention to provide an improved motor control system.

According to the invention, there is provided a system of control for a reluctance type motor. The system is operable to control the motor to produce torque in response to a continuously applied load with the rotor of said motor at any angular position and at any speed from zero angular velocity to a rated operating speed. The system includes a first summing amplifier which generates a signal whose magnitude is characteristic of the sum of the magnitudes of a signal signifying the instantaneous speed of the motor and a signal signifying the torque it is desired to have the motor produce. Also included in the system is a multiplier which generates a signal whose magnitude is characteristic of the product of the magnitudes of the instantaneous speed signal and the desired torque signal. A second summing amplifier receives both the multiplier output signal and a bias signal and generates a signal whose magnitude is characteristic of the sum of the magnitudes of both signals. The function of this bias signal is to cause the system to produce the rated excitation flux of the motor while it is at zero angular velocity so as to enable it to produce the desired maximum torque at that velocity. A rotor position transducer connected to the rotor of the motor for rotation thereby receives the output signals of the first and second summing amplifiers and produces signals signifying the magnitude, frequency and phase of the individual voltages to be applied to each phase winding of the motor to cause it to produce the desired torque. Signal translating apparatus receives these transducer signals and generates the individual voltages for the phase windings.

For convenience purposes, the invention will be described as applied in an elevator system. It is to be understood, however, that the invention is in no way limited to such an application and is suitable for various other applications. Also, the motor disclosed is a three phase one, it being understood that the invention is applicable to any polyphase reluctance type motor.

Advantages of the present invention as well as additional objects and features thereof will be apparent to those skilled in the art from the following description when considered in conjunction with the appended claims and accompanying drawing, in which the sole figure is a schematic representation of a system of control for a polyphase reluctance type motor.

Referring specifically to the drawing, there is depicted therein an elevator car 10 and its counterweight 11 supported in typical fashion by hoist ropes 12 wrapped over driving sheave 13. Sheave 13 is mounted on the same shaft as rotor 14 of a suitable three phase reluctance type motor whose stator phase windings are pictorially represented by coils A, B and C. Rotor 14 contains no windings whatsoever.

Direct current tachometer generator 15 is mechanically connected in any suitable fashion to be driven by the shaft of rotor 14 and produces a signal along lines $+V_T$ and $-V_T$ signifying the speed of rotation of rotor 14. Also connected to be driven by rotor 14 is a gear train GT. The output of this gear train drives a two pole permanent magnet rotor 16 of a Hall effect rotor position transducer to be explained hereinafter. The gear ratio of this gear train GT is such as to drive the rotor of the position transducer one mechanical revolution for each revolution through 360 electrical degrees of rotation of rotor 14 of the reluctance motor.

Connected to supply voltage to stator phase windings A, B and C is equipment identified as a variable frequency variable magnitude voltage generating means. At all frequencies within the capacity of this equipment it applies to the individual stator phase windings voltages which are so related to each other in magnitude, frequency and phase angle as to cause the motor to produce the torque it is desired to have it produce in accordance with a desired torque signal generated in a manner to be described hereinafter. Included as part of this equipment are suitable pulse modulated inverter circuits AI, BI and CI. These inverter circuits are controlled by pulses applied to their gate control circuits by pulse generators APG, BPG and CPG which operate at a suitable pulse repetition rate.

The input signal to each pulse generator is modulated by the output signal of sawtooth wave generator SWG which also operates at a suitable repetition rate. The output signal of generator SWG is added to the input signal applied to each of the pulse generators APG, BPG and CPG along lines $E_A$, $E_B$ and $E_C$, respectively, and the individual combinations depending upon how much of the combined signal remains above or below the zero axis represented by the solid line marked O.

Inverter circuits AI, BI and CI, pulse generators APG, BPG and CPG, and sawtooth wave generator SWG comprise that part of the voltage generating means hereinafter identified as signal translating apparatus. This apparatus, as is illustrated by the sinusoidally shaped waveforms adjacent each pulse generator and each inverter circuit, produce voltages for the phase windings A, B and C which are faithful reproductions of the signals applied along lines $E_A$, $E_B$ and $E_C$, respectively, in phase angle and frequency but which vary therefrom in magnitude by a predetermined constant scale factor.

The signals applied along lines $E_A$, $E_B$ and $E_C$ are produced by amplifiers 18 through 20, respectively. Each of these is a summation amplifier which produces an output signal proportional to the vector sum of the input signals it receives from amplifiers 22 and 23 or 24 and 25 or 26 and 27, respectively. Each of amplifiers 22 through 27 is a differential amplifier which produces an output signal referenced to ground which is directly proportional to the magnitude of the signal applied along its respective input lines $E_{A1}$, $E_{A2}$, $E_{B1}$, $E_{B2}$, $E_{C1}$ and $E_{C2}$. Amplifiers 18 through 27 comprise that part of the voltage generating means hereinafter referred to as the signal summing amplifier circuitry.

Also included as part of the voltage generating means is the previously mentioned rotor position transducer comprising the two pole permanent magnet rotor 16 which is mounted for rotation in a cylindrical stator yoke (not shown) composed of a satisfactory magnetic material. Suitably the permanent magnets of rotor 16 produce a sinusoidal flux distribution throughout the stator yoke. Mounted in any suitable fashion at intervals around the interior surface of the stator yoke are a plurality of Hall effect elements A1, A2, B1, B2, C1 and C2. First Hall effect elements A1, B1 and C1 are so mounted that the physical displacements between them correspond with the electrical displacements between the axes of the different phase windings of the stator poles of the motor. Second Hall effect elements A2, B2 and C2 are mounted in quadrature with their respective corresponding elements A1, B1 and C1.

Rotor 14 of the motor and rotor 16 of the position transducer are mechanically connected so that whenever one of the poles of rotor 14 is passing in a particular direction the physical location of the axis of one of the phase windings of a stator pole, say phase winding A, the corresponding pole of rotor 16 is passing in the same direction the second Hall effect element A2 corresponding to phase winding A.

CUrrent is provided for the first Hall effect elements A1, B1 and C1 through a series connection from first summing amplifier DAS. Similarly, current is provided for each of the second Hall effect elements through a series connection from second summing amplifier SUM.

First summing amplifier DAS produces an output signal whose magnitude is proportional to the sum of the magnitude of the signal along line TD and that of the signal along line $+V_T$. The signal along line TD signifies the torque it is desired the motor produce and is the difference between a speed at which it is desired that rotor 14 rotate and the actual speed at which it is rotating. It has already been stated that the signal along line $+V_T$ is produced by tachometer generator 15 and signifies the actual speed at which rotor 14 is rotating. This line is designated $+V_T$ to signify that the signal applied along it is to be understood to be an additive function in the mathematical analysis of the system in contrast to the signal along line $-V_T$ which it is to be understood is a substractive function in such analysis.

Amplifier DAS contains two separate linear scale factors. One produces one value of current for each volt of input signal along line $+V_T$ while the other produces a different and lesser value of current for each volt of signal along line TD. The reason for this is that in response to any input signal along line $+V_T$, an output signal is produced by amplifier DAS which generates applied voltages for phase windings A, B and C which balance the leakage reactance, or IX, drop across each winding produced by the excitation current then flowing in the winding as well as the so-called direct axis reactance drop owing to the excitation current which is hereinafter referred to as the counterelectromotive force which is produced in each respective winding at no load at the speed represented by the signal along line $+V_T$ by the flux generated by the excitation current then flowing in each winding. In contrast, in response to any input signal along line TD, an output signal is produced by amplifier DAS which generates applied voltage for phase windings A, B and C which balance the resistance, or IR, voltage drop across each winding produced by the load current then flowing in the winding.

Second summing amplifier SUM produces an output signal whose magnitude is characteristic of the sum of the magnitudes of the signal it receives from multilpier circuit QAM and a bias signal it receives along line Vc. This bias signal generates applied voltages for phase windings A, B and C which function to produce the rated excitation flux of the motor while it is at zero angular velocity so as to enable it to produce the maximum desired torque at that velocity. Such a flux, it should be understood, is equivalent to that produced by the rotor of a synchronous motor with a permanent magnet or wound rotor and having equal torque producing capabilities. It is assumed herein that the bias signal applied along line Vc is of constant magnitude although it it contemplated that this could be made variable in accordance with torque and speed.

Multiplier QAM produces an output signal whose magnitude is a linear function of the product of the magnitude of the signal along line $+V_T$ and that along line TD. The output signal from multiplier QAM produced in response to any signals along lines $+V_T$ and TD generates applied voltages for phase windings A, B and C which balance the leakage reactance, or IX, voltage drop produced across each respective winding at the speed represented by the signal along line $+V_T$ by the load current then flowing in the winding as well as the so-called quadrature axis reactance drop owing to the load current hereinafter referred to as the counterelectromotive force produced in each respective winding by the flux generated by the load current then flowing in the winding at the speed at which the rotor is rotating.

Since the output signals from amplifiers DAS and SUM generate applied voltages for the phase windings which balance the counterelectromotive forces which are produced across the windings as well as the IR and IX voltage drops produced across the windings, it is evident from well known motor analysis that proper voltages are generated for each condition of speed and torque.

First summing amplifier DAS, second summing amplifier SUM, multiplier QAM, the rotor position transducer and the signal or vector summing amplifiers 18 through 27 comprise what is hereinafter referred to as transducing apparatus. This apparatus in combination with the hereinbefore mentioned signal translating apparatus and with the hereinafter disclosed summation circuit 28 comprise the voltage generating means.

The input signal applied along line TD to both first summing amplifier DAS and multiplier QAM is transmitted from summation circuit 28 along line $V_{DS}$ through the preamplifier circuit PSN. Preamplifier PSN may also suitably include stability, or response shaping, networks to provide a response for the system as desired.

One of the input signals to summation circuit 28 is a desired speed signal applied along line $V_{st}$ from speed dictation apparatus 30. This signal is algebraically added to the other input signal, the actual speed signal, applied along line $-V_T$ from tachometer generator 15, to produce the output difference signal. Speed dictation apparatus 30 in the disclosed elevator system may take any one of a number of suitable forms.

From the foregoing it will be understood that the disclosed system of control for a reluctance type motor operates in response to a signal signifying a desired speed for the motor produced by speed dictating apparatus and a signal signifying the actual speed of the motor produced by speed responsive signal means. These signals, together with a rated excitation flux producing bias signal, cause a voltage generating means to apply voltage to said motor to control said motor to deliver torque to maintain a load which is continuously applied to the rotor of said motor at zero angular velocity. Moreover, the motor maintains such a load at any angular position of its rotor. By this is meant that there is no position of the rotor at which it cannot remain at zero angular velocity while a load is applied to it. Thus, when reference is made to any angular position of the rotor herein it is to be understood that this means that each of the infinite positions of the rotor is to be considered one at a time until all are considered.

In addition, the voltage generating means is operable in response to the difference between the desired speed signal and the actual speed signal to apply voltage to said motor to move any load within its rated capacity in any desired predetermined manner within its torque producing capabilities. The voltage generating means is responsive to the desired and actual speed signals to produce a signal signifying the difference between these speeds. This latter signal represents the torque it is desired that the motor produce. The voltage generating means includes transducing apparatus which operates in response to this desired torque signal, the excitation flux producing bias signal and a signal signifying the instantaneous speed of the motor. In the disclosed embodiment this latter signal is the actual speed signal but because of the fidelity of the system in tracking the desired speed signal, it is contemplated that this desired speed signal could also be employed as the instantaneous speed signal. The transducing apparatus produces signals signifying the individual voltages to be applied to the stator phase windings of the motor to produce the desired torque.

The transducing apparatus of the voltage generating means includes a rotor position transducer connected to the rotor of the motor. This transducer operates to produce two voltages for each phase winding of the motor. One of these is a signal voltage signifying the magnitude, frequency and phase of the voltage to be applied to the associated phase winding to balance the counterelectromotive force produced by the flux generated by the excitation current then flowing in the winding as well as the leakage reactance drop across that winding produced by that excitation current and the resistance voltage drop across that winding produced by the load current flowing in the winding at the instantaneous speed at which the rotor is then rotating. The other is a signal voltage containing two components. One signifies the magnitude, frequency and phase of the voltage to be applied to the associated phase winding to balance both the leakage reactance voltage drop across the winding produced by the load current then flowing in the winding and the counterelectromotive force produced by the flux generated by the load current then flowing in the winding at the speed the rotor is then operating. The other signifies that component of its associated stator winding voltage which produces the rated excitation flux of the motor while it is at zero angular velocity so as to enable it to produce the maximum desired torque at that velocity. These signal voltages for each phase winding are vectorially summed in signal summing amplifier circuitry, which also constitutes part of the transducing apparatus, to produce signals signifying the magnitude, frequency and phase of the individual voltages to be applied to the stator windings in order to produce the desired torque. Signal translating apparatus, which forms part of the voltage generating means, operates in response to the output signals of the signal summing amplifier circuitry to apply the individual voltages to the respective stator phase windings.

Various modifications are considered possible without departing from the scope of the invention. It is intended, therefore, that the specific embodiment hereinbefore described not be considered exclusive or limiting in any regard.

What is claimed is:

1. A control system including a polyphase alternating current reluctance motor which produces torque in accordance with applied load with the rotor of said motor at any angular position through its speed range from zero angular velocity to a rated running speed, said system also including a variable magnitude, variable frequency voltage generating means which in response to an excitation flux producing signal and to a desired torque signal, which signifies the torque it is desired that the motor produce, applies an individual voltage to each phase winding of the motor stator to generate an excitation flux for said motor and to control it to produce said desired torque.

2. A control system according to claim 1, including transducing apparatus which operates in response to said desired torque signal and a signal signifying the instantaneous speed of the motor rotor to produce signals which are applied to the voltage generating means and control the magnitude, phase and frequency of the individual voltages applied to said stator phase windings.

3. A control system according to claim 2 wherein said transducing apparatus operates in response to said desired torque signal and said instantaneous speed signal to produce a pair of signals, the magnitude of each of said signals varying in accordance with the desired torque and the instantaneous speed of the rotor throughout its speed range, said apparatus utilizing said pair of signals to produce the signals signifying the individual voltages to be applied to said stator windings.

4. A control system according to claim 3, wherein said transducing apparatus includes a first summing amplifier and a multiplier, both receiving said desired torque signal and said instantaneous speed signal and each producing one of said pair of signals, the summing amplifier producing a signal signifying the sum of the magnitudes of the two signals it receives and the multiplier producing a signal signifying the product of the two signals it receives.

5. A control system according to claim 4 wherein said transducing apparatus includes a second summing amplifier which receives both the output signal from said multiplier and said excitation flux producing signal and produces an output characteristic of the sum of the magnitudes of the two signals it receives, said excitation flux producing signal being a bias signal which causes said voltage generating means to apply voltages to said stator windings which produce the rated excitation flux of said motor while it is at zero angular velocity so as to enable it to produce the maximum desired torque at that velocity.

6. A control system according to claim 5, wherein said transducing apparatus includes a rotor position transducer including a cylindrical stator yoke of magnetic material, a two pole permanent magnet rotor mounted for rotation in said cylindrical stator yoke and producing a sinusoidal flux distribution therethrough, said two pole permanent magnet rotor being mechanically connected to the rotor of said motor for rotation therewith and a plurality of Hall effect elements, two such elements for each phase winding of said motor, said elements being mounted at intervals around the interior surface of said yoke so that the physical location of a different first one of such elements corresponds with the physical location of the axis of a different one of the individual phase windings of a stator pole of said motor and a different second such element is in quadrature with each such first element.

7. A system according to claim 6 wherein the two pole permanent magnet rotor of said rotor position transducer is geared to the rotor of said motor so that one of the poles of said transducer rotor passes the second Hall effect element which is in quadrature with the first element corresponding to one of the phase windings of a stator pole of said motor each time one of the poles of the motor rotor passes the physical location of the axis of the corresponding stator pole phase winding.

8. A system according to claim 7, wherein each said first Hall effect element receives the output signal of said first summing amplifier and produces a signal signifying that component of the individual voltage for its associated phase winding which balances the counterelectromotive force which would be produced across said phase winding at no load at the speed at which the rotor is then rotating by the flux generated by the excitation current then flowing in each winding as well as the leakage reactance drop across each winding by the excitation current then flowing in the winding and the resistance voltage drop produced across said phase winding by the load current it is then conducting.

9. A system according to claim 8, wherein each said second Hall effect element receives the output signal of said second summing amplifier and produces a signal signifying both that component of the individual voltage for its associated phase winding which balances the leakage reactance voltage drop produced across said phase winding by the load current it is then conducting at the speed at which the rotor is then rotating as well as the counterelectromotive force produced at that speed in said phase winding by the flux generated by the load current then flowing in the winding and that component which produces the rated excitation flux of said motor while it is at zero angular velocity so as to enable it to produce the maximum desired torque.

10. A system according to claim 9, wherein said transducing apparatus includes signal summing amplifier circuitry for each phase winding of said motor, each said signal summing amplifier circuitry receiving the signal produced by the first and second Hall effect elements associated with its respective phase winding and producing an output signal signifying the vector sum of said signals.

11. A control system according to claim 10, including speed dictation apparatus generating a signal signifying a desired speed for said motor, a speed responsive generator generating a signal signifying the actual speed of said motor, and a summation circuit responsive to said desired and actual speed signals producing said desired torque signal.

12. A control system for a polyphase reluctance type motor operable to control said motor to produce torque in response to a continuously applied load with the rotor of said motor at any angular position and at any speed from zero angular velocity to a rated operating speed, said system including a first summing amplifier generating a signal whose magnitude is characteristic of the sum of the magnitudes of a signal signifying the instantaneous speed of said motor and a signal signifying the torque it is desired to have said motor produce, a multiplier generating a signal whose magnitude is characteristic of the product of the magnitude of said instantaneous speed signal and said desired torque signal, a second summing amplifier generating a signal whose magnitude is characteristic of the sum of the magnitudes of said multiplier output signal and a bias signal, said bias signal operating to produce the rated excitation flux of said motor while it is at zero angular velocity so as to enable it to produce the maximum desired torque, a rotor position transducer connected to the rotor of said motor for rotation thereby, said transducer receiving said first and second summing amplifier output signals and producing signals signifying the magnitude, frequency and phase of the individual voltages to be applied to each phase winding of said motor to cause it to produce said desired torque and signal translating apparatus receiving said transducer signals and generating said individual voltages.

13. A control system according to claim 12, wherein said rotor position transducer produces a first and second output signal for each phase winding in response to said first and second summing amplifier output signals, respectively, said first transducer output signal for each phase winding signifying that component of the voltage to be applied to its associated phase winding to balance the counterelectromotive force which would be generated at no load in said phase winding at the speed at which the rotor is then rotating by the flux produced by the excitation current then flowing in the winding as well as the leakage reactance drop across the winding produced by that excitation current and the resistance voltage drop therein owing to the load current then flowing in said phase winding, said second transducer output signal for each phase winding signifying both that component of the voltage to be applied to its associated phase winding to balance the leakage reactance voltage drop across said phase winding owing to the load current then flowing therein and to the speed at which the rotor is then rotating as well as to the counterelectromotive force produced at that speed in said winding by the flux generated by said load current and that component of the voltage applied to its associated phase winding which produces the rated excitation flux of the motor while it is at zero angular velocity so as to enable it to produce the maximum desired torque.

14. A control system according to claim 13, including speed dictation apparatus generating a signal signifying a desired speed for said motor, a speed responsive generator generating a signal signifying the actual speed of said motor, and a summation circuit responsive to said desired and actual speed signals producing said desired torque signal.

* * * * *